United States Patent
Paulraj

(10) Patent No.: US 10,038,655 B2
(45) Date of Patent: Jul. 31, 2018

(54) SYSTEM AND METHOD FOR LICENSE ENFORCEMENT OF EMAIL MESSAGE RECOVERY APPLICATION

(71) Applicant: Dell Products L.P., Round Rock, TX (US)

(72) Inventor: Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 338 days.

(21) Appl. No.: 13/685,829

(22) Filed: Nov. 27, 2012

(65) Prior Publication Data

US 2014/0149516 A1    May 29, 2014

(51) Int. Cl.
*G06F 15/16* (2006.01)
*H04L 12/58* (2006.01)

(52) U.S. Cl.
CPC .............. *H04L 51/08* (2013.01); *H04L 51/18* (2013.01)

(58) Field of Classification Search
CPC .......... H04L 12/58; H04L 51/08; H04L 51/18
USPC .......................... 709/206, 204, 217, 218, 219
See application file for complete search history.

(56) References Cited

U.S. PATENT DOCUMENTS

| 7,865,548 B2* | 1/2011 | Chen et al. .................... 709/203 |
| 7,921,176 B2* | 4/2011 | Madnani ....................... 709/207 |
| 2005/0146966 A1* | 7/2005 | Kawamura .................... 365/222 |
| 2008/0208754 A1* | 8/2008 | Zunke et al. .................... 705/59 |
| 2009/0092253 A1* | 4/2009 | Asipov et al. ................. 380/278 |
| 2013/0247209 A1* | 9/2013 | Didcock et al. ................. 726/26 |
| 2014/0047429 A1* | 2/2014 | Gaither ..................... G06F 8/60 717/170 |

OTHER PUBLICATIONS

P. Deepaganesh, U.S. Appl. No. 13/474,324, filed May 17, 2012 entitled System and Method for Recovering Electronic Mail Messages Deleted from an Information Handling System.

\* cited by examiner

*Primary Examiner* — Liangche A Wang
*Assistant Examiner* — Kaylee Huang
(74) *Attorney, Agent, or Firm* — Terrile, Cannatti, Chambers & Holland, LLP; Stephen A. Terrile

(57) ABSTRACT

A system, method, and computer-readable medium are disclosed for automating enforcement of a license for an electronic mail (email) message recovery plug-in. A first email message recovery plug-in associated with a first information handling system generates a first email message to request a recovery of a second email message. A first license identifier, which is associated with the first email message recovery plug-in, is then attached to the first email message, which in turn is sent to a second information handling system comprising a second email message recovery plug-in. In response, a third email message is received from the second information handling system, comprising the second email and a second license identifier associated with the second email message recovery plug-in. The first and second license identifiers are compared to see if they are the same. If they are, then license remediation operations are performed.

18 Claims, 11 Drawing Sheets

SYSTEM AND METHOD FOR LICENSE ENFORCEMENT OF EMAIL MESSAGE RECOVERY APPLICATION

BACKGROUND OF THE INVENTION

Field of the Invention

The present invention relates to the management of information handling systems. More specifically, embodiments of the invention provide a system, method, and computer-readable medium for automating enforcement of a license for an electronic mail (email) message recovery application.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An electronic mail (email) server can transfer messages to and from an information handling system. The email server can store a copy of each message that passes through the email server in a local memory. However, if a storage limit of the local memory of the email server is exceeded, the email server can send the email messages to the information handling system and delete the email message from the local storage. When the information handling system receives the email messages from the email server, the information handling system can create or assign a memory location within a local hard disk drive of the information handling system to store the email messages. When the email messages have been stored in the local hard disk of the information handling system, the server may no longer store a copy of the email messages.

SUMMARY OF THE INVENTION

A system, method, and computer-readable medium are disclosed for automating enforcement of a license for an electronic mail (email) message recovery application (e.g., a plug-in). In various embodiments, a first email message recovery application associated with a first information handling system generates a first email message to request a recovery of a second email message. A first license identifier, which is associated with the first email message recovery application, is then attached to the first email message, which in turn is sent to a second information handling system comprising a second email message recovery application. In response, a third email message is received from the second information handling system, comprising the second email and a second license identifier associated with the second email message recovery application. The first and second license identifiers are compared to see if they are the same. If they are, then license remediation operations are performed.

In one embodiment, the first email message recovery application generates a fourth email message to request recovery of the second email. The first license identifier is then attached to the fourth email message, which in turn is sent to a third information handling system comprising a third email message recovery application. In response, a fifth email message is received from the third information handling system, comprising the second email and a third license identifier associated with the third email message recovery application. The first, second and third license identifiers are compared to see if any of them are the same. If they are, then license remediation operations are performed.

In various embodiments, the first, second and third license identifiers are respectively associated with the email user identifiers of a first, second and third email user, which respectively are users of the first, second and third information handling systems. In certain of these embodiments, the first, second and third license identifiers correspond to first, second and third single user licenses to respectively use the first, second and third email message recovery applications. In certain embodiments, the first, second and third license identifiers correspond to first, second and third floating licenses to respectively use the first, second and third email message recovery applications. In these embodiments, the first, second and third users are members of a pool of email users and the first, second and third floating licenses are assigned in response to receiving a floating license request from a member of the pool of email users.

BRIEF DESCRIPTION OF DRAWINGS

The present invention may be better understood, and its numerous objects, features and advantages made apparent to those skilled in the art by referencing the accompanying drawings. The use of the same reference number throughout the several figures designates a like or similar element.

FIG. 11 is a flow diagram of a method for performing node-level enforcement of a license enforcement for an email message recovery plug-in; and FIG. 12 is a flow diagram of a method for performing cross-node enforcement of a license for an email message recovery plug-in.

DETAILED DESCRIPTION

A system, method, and computer-readable medium are disclosed for automating enforcement of a license for an electronic mail (email) message recovery plug-in application. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to trans communications between the various hardware components.

Figure 1:
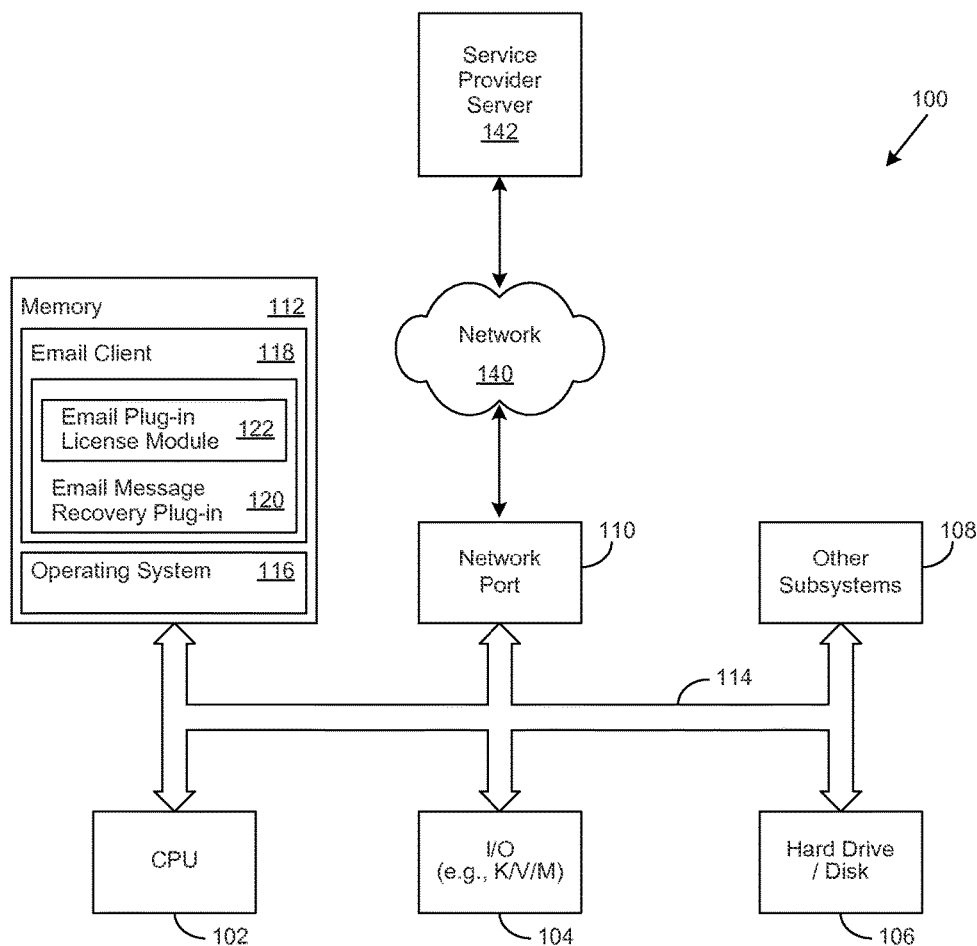
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an electronic mail (email) client 118. In these and other embodiments, the email client 118 may likewise comprise an email message recovery application 120 (which in certain embodiments may comprise a plug-in type application). In certain embodiments, the email message recovery plug-in may comprise an email application license module 122 (which in certain embodiments may comprise a plug-in type application). In one embodiment, the information handling system 100 is able to download the email client application 118, the email message recovery plug-in 120, and the email plug-in license module 122 from the service provider server 142. In another embodiment, the email client application 118, the email message recovery plug-in 120, and the email plug-in license module 122 is provided as a service from the service provider server 142.

Figure 2:
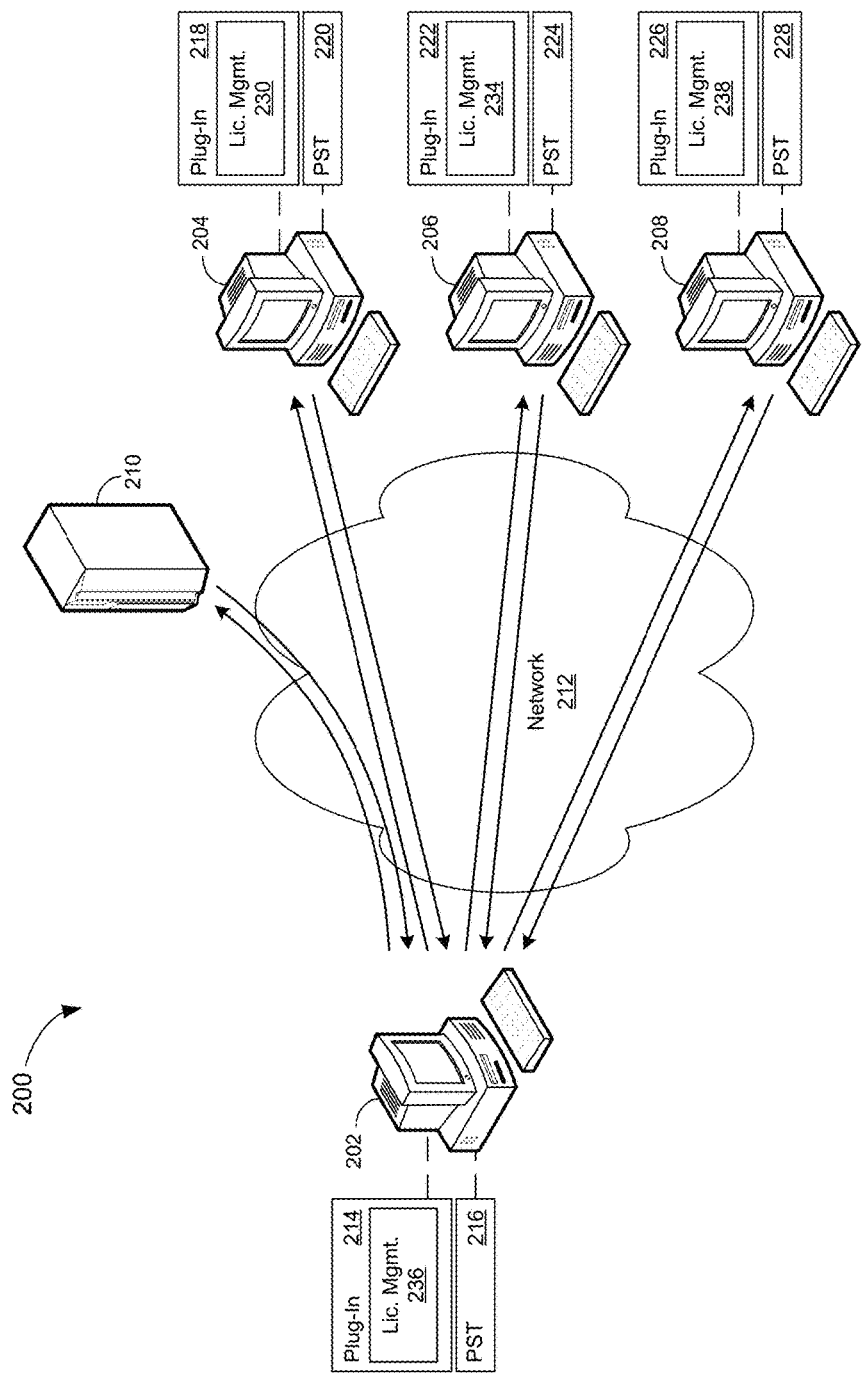
FIG. 2 is a block diagram of an electronic mail (email) message system.

FIG. 2 is a block diagram of an electronic mail message system as implemented in an embodiment of the invention. As shown in FIG. 2, the electronic mail (email) message system 200 includes multiple information handling systems 202, 204, 206, and 208. As likewise shown in FIG. 2, the email message system 200 also includes a mail server 210 and a network 212. The information handling system 202 is in communication with each of the other information handling systems 204, 206, and 208 and with the mail server 210 via the network 212. The information handling system 202 includes an email message recovery plug-in 214, which in turn comprises an email plug-in license module 236, and personal folder files (PST) 216. The information handling system 204, 206 and 208 respectively include email message recovery plug-ins 218, 222, 226, which in turn respectively comprise email plug-in license modules, 230, 234, 238, and a PST 220, 224, 228. Each of the information handling systems 202, 204, 206, and 208 can send email messages to one of the other information handling systems via the mail server 210, or can send email messages directly to the other information handling systems via a client-to-client communication. For simplicity, only communications to and from the information handling system 202 are shown in FIG. 2.

The mail server 210 can receive emails addressed to or from one of the information handling systems 202, 204, 206, and 208. When the email is received, the mail server 210 can save a copy of the email in a local memory of the mail server and then send the email to the destination information handling system 202, 204, 206, or 208. The email can either be pushed to or pulled by the corresponding information handling system 202, 204, 206, or 208. If the mail server 210 reaches a storage limit of the local memory of the mail server, the mail server can send the emails stored in the local memory to the information handling system 202, 204, 206, or 208 associated with the emails and then delete the emails from the local memory. For example, the mail server 210 can send the information handling system 202 emails that are either sent from or sent to that information handling system when the storage limit of the server is exceeded. The information handling system 202 can then store these emails in the PST 216. If one or more of the emails in the PST 216 are deleted, the information handling system 202 may need to recover those emails from the other information handling systems 204, 206, and 208. One of ordinary skill in the art will recognize that each of the information handling systems 202, 204, 206, and 208 can operate in substantially the same manner. Thus, the operation of recovering deleted emails will be described only with respect to information handling system 202.

Figure 3:
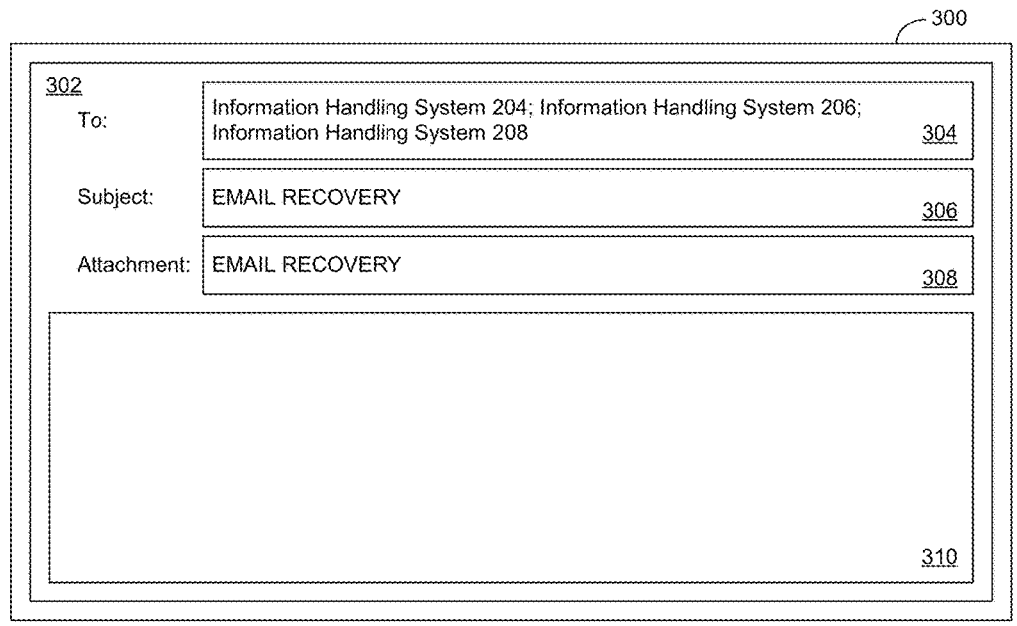
FIG. 3 shows an exemplary email message associated with an electronic mail message system.

The email message recovery plug-in 214 can be executed along with an email client application of the information handling system 202. When a user determines that emails have been permanently deleted from the PST 216, the user can launch the email message recovery email message recovery plug-in 214 to recover the deleted emails. The email message recovery plug-in 214 can then create a request to recover the deleted emails from one of the other information handling systems 204, 206, and 208. In an embodiment, the request can be a recovery email message 302 as shown in FIG. 3.

The email message recovery email message recovery plug-in 214 can be executed along with an email client application of the information handling system 202. When a user determines that emails have been permanently deleted from the PST 216, the user can launch the email message recovery email message recovery plug-in 214 to recover the deleted emails. The email message recovery plug-in 214 can then create a request to recover the deleted mails from one of the other information handling systems 204, 206, and 208. In an embodiment, the request can be a recovery email message 302 as shown in FIG. 3.

In various embodiments, a single-user license for an email message recovery plug-in 214, 218, 222, 226 is assigned to an individual email user. In these various embodiments, the email message recovery plug-in 214, 218, 222, 226 may be installed in one or more nodes, such as information handling systems 202, 204, 206, 208 associated with the email user. As used herein, a node broadly refers to any system or device operable to access the features of the email message recovery plug-in 214, 218, 222, 226.

In these various embodiments, a single user license for the email message recovery plug-in 214, 218, 222, 226 is purchased by the email user, who then registers their email user ID (UID) in the mail server 210 for subsequent assignment. Once registered the email user's UID is assigned to the single user license. In turn, the single-user license is then attached to an email message addressed to the email user. In one embodiment, the license is encrypted prior to being attached to the email message. In another embodiment, the license is valid for a predetermined time period. In yet another embodiment, the license is perpetual. In still another embodiment, the license is valid according to predetermined metrics, such as a predetermined number of uses or a predetermined number of recovered email messages. Those of skill in the art will recognize that many such embodiments are possible and that the foregoing is not intended to limit the spirit, scope or intent of the invention. The email message is then sent to the email user, and once received, it is extracted from the email message. In one embodiment, the single-use license is decrypted when it is extracted. Thereafter the single user license is stored in the cache of the previously-installed email message recovery plug-in 214, 218, 222, 226.

In various embodiments, a floating license for an email message recovery plug-in 214, 218, 222, 226 is assigned to an individual email user of a pool, or group, of email users. In these various embodiments, the email message recovery plug-in 214, 218, 222, 226 may be installed in one or more nodes, such as information handling systems 202, 204, 206, 208, associated with any email user that is a member of the pool or group. However, the floating license is only valid for assignment to one email user at a time. Once the email user is no longer using the email message recovery plug-in, its assigned floating license is returned to the pool of licenses for reassignment to another email user. In various embodiments, the assignment may be for a short period of time, such as the time required to recover a single email message, or for a longer period of time, such as an email user's term of employment with an employer who purchased the floating license.

In these and other embodiments, the email user ID (UID) of each email user in a pool of email users is registered in the mail server 210 for subsequent assignment of floating licenses. An email message recovery plug-in 214, 218, 222, 226 is then installed in various nodes, such as information handling systems 202, 204, 206, 208, associated with each of the registered email user in the pool of email users. One or more floating licenses are then purchased, which are in turn likewise registered in the mail server 210.

A request for a floating license is then received from a member of the email user pool, followed determining whether an unassigned floating license is available. If it is, then it is assigned to the UID of the requesting email user. The available floating license is then attached to an email message addressed to the email user. In one embodiment, the floating license is encrypted prior to being attached to the email message. In another embodiment, the floating license is assigned to the email user for a predetermined time period. In yet another embodiment, the assignment of the floating license to the email user is limited by one or more metrics, such as a predetermined number of uses or the recovery of a predetermined number of email messages. In still another embodiment, the assignment of the floating license is perpetual until it is no longer needed by the email user. At that time it is returned to the email server for subsequent reassignment. Those of skill in the art will recognize that many such embodiments are possible and that the foregoing is not intended to limit the spirit, scope or intent of the invention.

The email message is then sent to the requesting email user, and once received, it is extracted from the email message. In one embodiment, the floating license is decrypted when it is extracted. Thereafter, it is stored in the cache of the previously-installed email message recovery plug-in 214, 218, 222, 226.

In various embodiments, node-level enforcement of a license for an email message recovery plug-in 214, 218, 222, 226 is initiated by the email message recovery plug-in checking for the validity of its associated single-user or floating license. If it determines that the single user or floating point license is not valid, then the operation of the email message recovery plug-in 214, 218, 222, 226 switches to an alternative mode. In one embodiment, the alternative mode disables the operation of the email message recovery plug-in and the email user is provided a notification of the disablement. In another embodiment, the alternative mode reduces the functionality of the email message recovery plug-in 214, 218, 222, 226, such as limiting the number of email messages that can be recovered. If the license is a floating license, then the email message recovery plug-in 214, 218, 222, 226 retrieves the license from the mail server 210 by passing the email user's user identifier (UID). However, if the license is a single-user license, then the email message recovery plug-in 214, 218, 222, 226 reads the license locally from its cache.

In various embodiments, cross-node enforcement of a license for an email message recovery plug-in 214, 218, 222, 226 is initiated during an email message recovery operation described in greater detail herein. In these various embodiments, the sending email user's license for the email message recovery plug-in 214, 218, 222, 226 is sent along with the recovery criteria in an email recovery request. The receiver's email message recovery plug-in 214, 218, 222, 226 then parses the recovery request and compares its own license with the sender's license.

If the two are the same then it is assumed that either one or both of the email users is illegally using the same license and an email usage message containing pertinent illegal usage information is sent to a license administrator for appropriate action. However, if the licenses are not the same, then the receiver's license is sent in an email recovery response with any recovered email messages to the sender's email message recovery plug-in 214, 218, 222, 226.

In turn, the sender's email message recovery plug-in 214, 218, 222, 226 parses the receiver's license from the email recovery response and compares it to licenses parsed from other email recovery responses. If any of the parsed licenses are the same, then it is assumed that one or more of the email users are illegally using the same license and an email usage message containing pertinent illegal usage information is sent to a license administrator for appropriate action. If it is determined that the receiver's license for the email message recovery plug-in 214, 218, 222, 226 is expired, then the sender's email message recovery plug-in 214, 218, 222, 226 ceases email message recovery operations and notifies the receiver to that effect. Otherwise, email message recovery operations are completed.

FIG. 3 shows an exemplary electronic mail (email) message associated with an electronic mail message system implemented in accordance with an embodiment of the invention. As shown in FIG. 3, a display unit 300 of the information handling system 204 includes a recovery email message 302, which in turn includes an "Addressed To" line 304, a "Subject" line 306, an "Attachment" line 308, and a message body 310. The email message recovery plug-in 214 can retrieve a list of email addresses for devices, such as information handling systems 204, 206, and 208 that may have copies of email messages deleted from the PST 216. In an embodiment, the list of devices can be generated based on contacts in the email client application, business contacts, or the like. The email message recovery plug-in 214 can then insert all of the email addresses in the list of email addresses in the "Addressed To" line 304, and can enter "EMAIL RECOVERY" into the "Subject" line 306.

The email message recovery plug-in 214 can then determine different search criteria associated with the deleted email messages, such as a size range, a date range, "Subject" line 306 keywords, and message body 310 keywords. For example, the size range can be a request for any email messages associated with the information handling system 202 that are less than thirty kilobytes in size, that are between twenty and one hundred kilobytes in size, and the like. The date range can be any email messages sent to or received from the information handling system 202 before a certain date, during a particular year, or the like. The "Subject" line 306 and message body 310 keywords can be words to search for that may be associated with a particular project name, with an event, with a person, or the like.

The email message recovery plug-in 214 can then compile the search criteria along with an authentication digital signature into an extensible markup language (XML) file, which can in turn be attached to the recovery email message 302 as an attachment 308. The email message recovery plug-in 214 can leave the message body 310 blank. When email message recovery plug-in 214 completes the recovery email message 302, the email message recovery plug-in 214 can send the recovery email message 302 to each of the information handling systems 204, 206, and 208 listed in the "Addressed To" line 304.

Referring back to FIG. 2, the information handling system 202 can send the recovery email message 302 directly to each of the information handling systems 204, 206, and 208 via the network 212 without the recovery email message being routed through the mail server 210. The recovery email message 302 can be sent to the other information handling systems 204, 206, and 208 via a client-to-client communication. The email message recovery plug-ins 218, 222, and 226 of the respective information handling systems 204, 206, and 208 can run along with an email client application executed on the information handling systems, and scan the "Subject" line 306 of email messages received by the email client application to determine whether an email recovery request has been received. Thus, when the recovery email message 302 is received at the information handling system 204 the email message recovery plug-in 218 can scan the "Subject" line 306 of the recovery email message 302, and can determine that the recovery email message 302 is an email recovery request based on the "Subject" line 306 in the recovery email message 302 including the words "EMAIL RECOVERY."

The email message recovery plug-in 218 can then download the attachment 308 of the recovery email message 302, and parse the search criteria XML file of the attachment 308 to determine the search criteria for the email recovery request and to authenticate the recovery email message 302. The email message recovery plug-in 218 can authenticate the recovery email message 302 by verifying the digital signature included in the search criteria XML file. When the email message recovery plug-in 218 verifies the recovery email message 302, the email message recovery plug-in 218 can display a message 402 on a display device 400 of the information handling system 204 as shown in FIG. 4.

Figure 4:
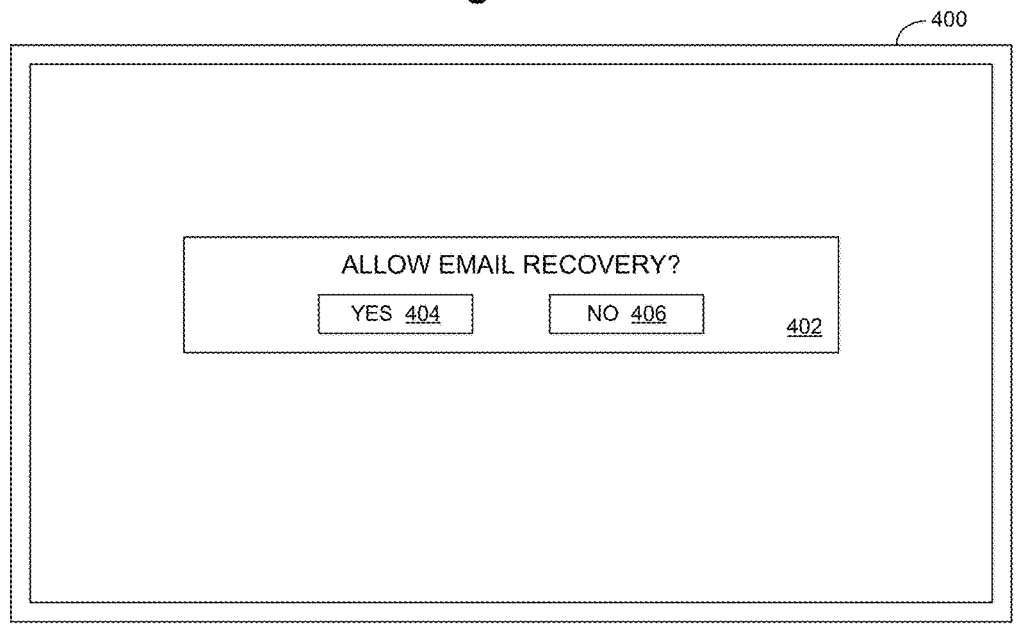
FIG. 4 is an exemplary screen shot displaying an email recovery message.

FIG. 4 is an exemplary screen shot displaying an electronic mail (email) recovery message as implemented in accordance with an embodiment of the invention. As shown in FIG. 4, the display device 400 includes the message 402, a "YES" selectable icon 404, and a "NO" selectable icon 406. The email message recovery plug-in 218 can display the message 402 to determine whether a user of the information handling system 204 wants to allow the email message recovery plug-in 218 to perform the email message recovery requested by the recovery email message 302. If the "YES" selectable icon 404 is selected, the email message recovery plug-in 218 can perform the email message recovery. However, if the "NO" selectable icon 406 is selected, the email message recovery plug-in 218 will not perform the email message recovery. In an embodiment, the user of the information handling system can set a global default to allow all email recovery requests in the email message recovery plug-in 218, which in turn can cause the email message recovery plug-in 218 to perform email message recovery operations without seeking permission from the user.

Referring back to FIG. 2, the email message recovery plug-in 218 can then perform the email message recovery by searching the PST 220, an inbox folder of the email client application on the information handling system 204, and sent folder of the email client application, and the like. When the email message recovery plug-in 218 has searched all of the email messages stored in the information handling system 204, the email message recovery plug-in 218 can store any email messages that match the search criteria in a local memory of the information handling system 204. The email message recovery plug-in 218 can then generate an email recovery response 500 as shown in FIG. 5.

Figure 5:
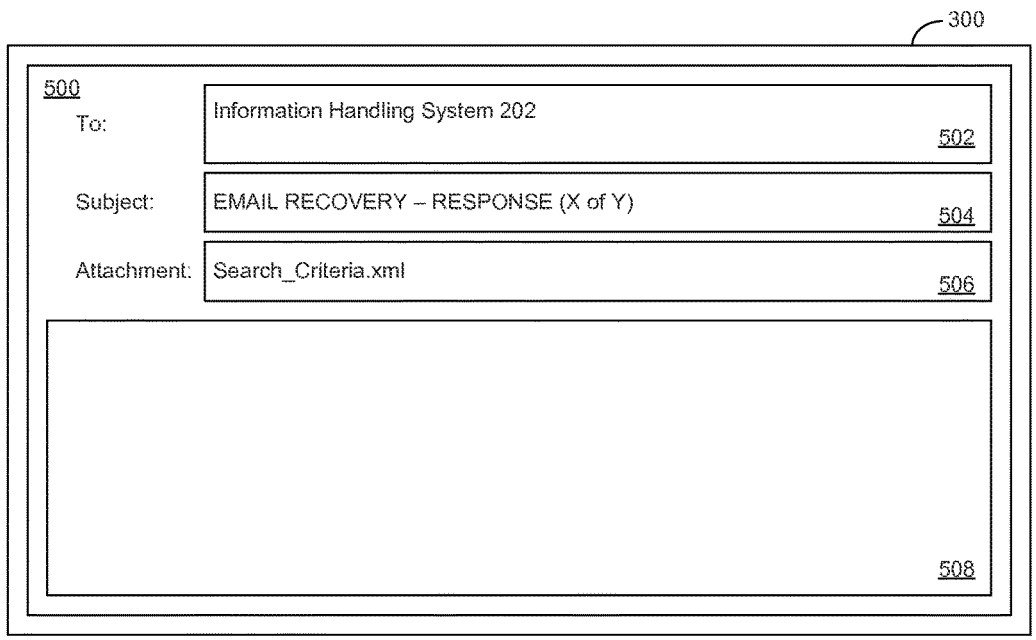
FIG. 5 shows an email message recovery response associated with an email message system.

FIG. 5 shows an electronic mail (email) message recovery response associated with an email message system implemented in accordance with an embodiment of the invention. As shown in FIG. 5, shows the display device 400 of the information handling system 204 includes the email recovery response 500, which in turn includes an "Addressed To" line 502, a "Subject" line 504, "Attachments" 506, and a message body 508. Because the email recovery response 500 is sent to the device that sent the email recovery request, the email message recovery plug-in 218 can include the information handling system 202 in the "Addressed To" line 502. The plugin 218 can attach the search criteria XML file and the emails identified to match the search result as "Attachments" 506 to the email recovery response 500. If a size of the identified email messages is too large for one email message, the email message recovery plug-in 218 can divide the response into multiple email messages and can include "EMAIL RECOVERY-RESPONSE (X of Y)" in the "Subject" line 504 of each of the response email messages containing the identified email messages. Otherwise, the email message recovery plug-in 218 can include "EMAIL RECOVERY-RESPONSE" in the "Subject" line 504. The email message recovery plug-in 218 can leave the message 508 blank.

Referring back to FIG. 2, the information handling system 204 can then send the email recovery response 500 to the information handling system 202 via a client-to-client communication. The information handling system 202 can also receive email recovery responses 500 from the other information handling systems 206 and 208 including the email messages identified by the respective email message recovery plug-ins 222 and 226 based upon searching the respective PST 224 and 228. The email message recovery plug-in 214 can detect the email recovery responses based on the subject lines including "EMAIL RECOVERY-RESPONSE (X of Y)" or "EMAIL RECOVERY-RESPONSE." The email message recovery plug-in 214 can then download all of the email messages attached to the email recovery responses, and can compare the recovered email messages to determine whether there are any duplicates. If there are duplicates, the email message recovery plug-in 214 can delete the duplicate messages so that only one email message of each set of duplicates remains. The email message recovery plugin 214 can then store the recovered email messages in the PST 216 and in the proper folder of the email client application executed by the information handling system 202.

For example, the email message recovery plug-in 214 can place any recovered email message that was originally sent from the information handling system 202 into a "Sent" folder of the email client application of the information handling system 202. Also, the email message recovery plug-in 214 can place any recovered email message that was originally sent to the information handling system 202 into an "Inbox" folder of the email client application of the information handling system 202.

Figure 6:
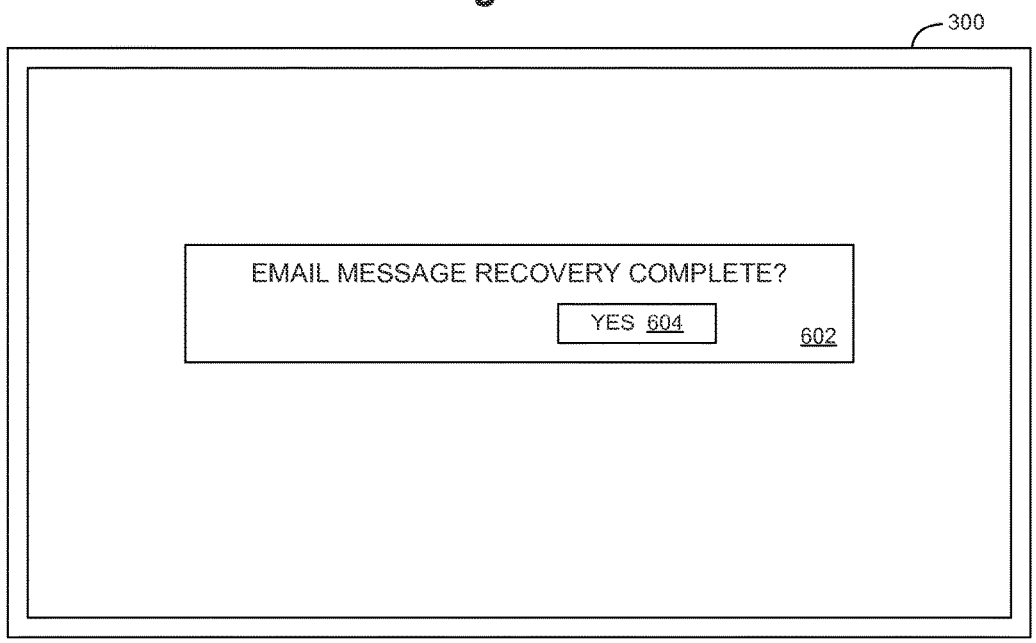
FIG. 6 is an exemplary screen shot displaying an email recovery complete message.

FIG. 6 is an exemplary screen shot displaying an electronic mail (email) recovery complete message implemented in accordance with an embodiment of the invention. After the email message recovery plug-in 214 has stored the recovered email messages in the PST 216 and placed the email messages in the proper folders, the email message recovery plug-in 214 can display an "EMAIL MESSAGE RECOVERY COMPLETE?" message 602 on the display device 300 of the information handling system 202. The user of the information handling system 202 can close the "EMAIL MESSAGE RECOVERY COMPLETE?" 602 by selecting a selectable "OK" icon 604 within the "EMAIL MESSAGE RECOVERY COMPLETE?" message as shown in FIG. 6.

Figure 7:
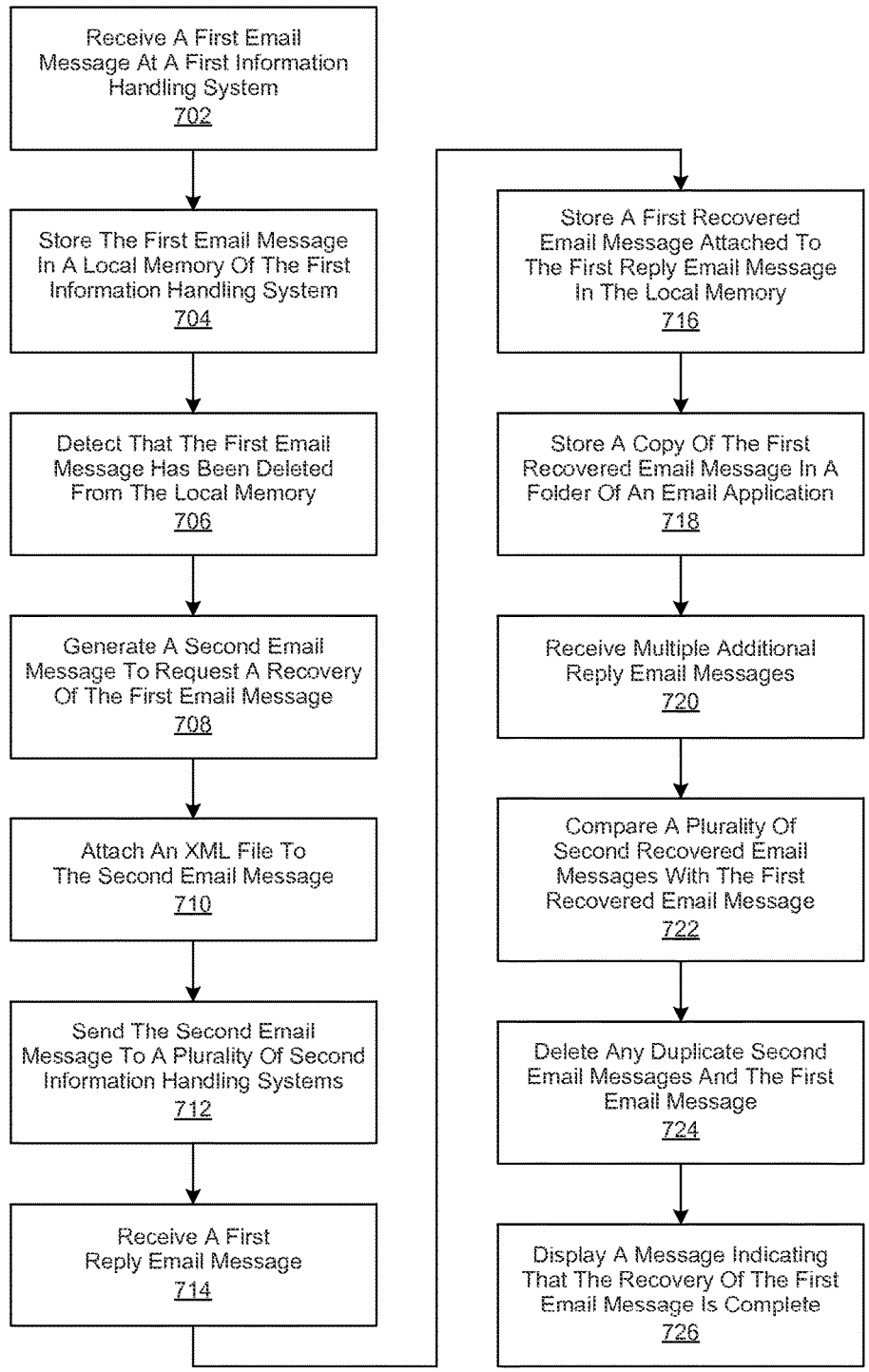
FIG. 7 is a flow diagram of a method for controlling recovery of an email message in an email message system.

FIG. 7 is a flow diagram of a method implemented in accordance with an embodiment of the invention for controlling recovery of an electronic mail (email) message in an electronic mail message system. In this embodiment, at block 702, a first email message is received at a first information handling system from a server in response to a storage capacity of the server being exceeded. The first email message received from the server is stored into a local memory of the first information handling system at block 704. At block 706, detect that the first email message has been permanently deleted from a local memory of the first information handling system. A second email message is generated to request a recovery of the first email message at block 708. At block 710, an XML file is attached to the second email message. The XML file can include search criteria associated with the recovery of the first email message, and the search criteria can be a size range, a date range, subject line keywords, and message body keywords.

At block 712, the second email message is sent to a plurality of second information handling systems. A reply email message is received from one of the plurality of second information handling systems at block 714. The reply email message can include a first recovered email message. At block 716, the first recovered email message attached to the reply email message is stored in the local memory of the first information handling system. A copy of the first recovered email message is stored in a folder of an email client application of the first information handling system at block 718. At block 720, multiple additional reply email messages including a plurality of second recovered email messages that match the search criteria are received. The plurality of second recovered email messages and the first recovered email message are compared at block 722. At block 724, any duplicate email messages of the plurality of second recovered email messages and the first reply email message are deleted. A message is displayed on a display device of the information handling system indicating that the recovery of the first email message was successful at block 726.

Figure 8:
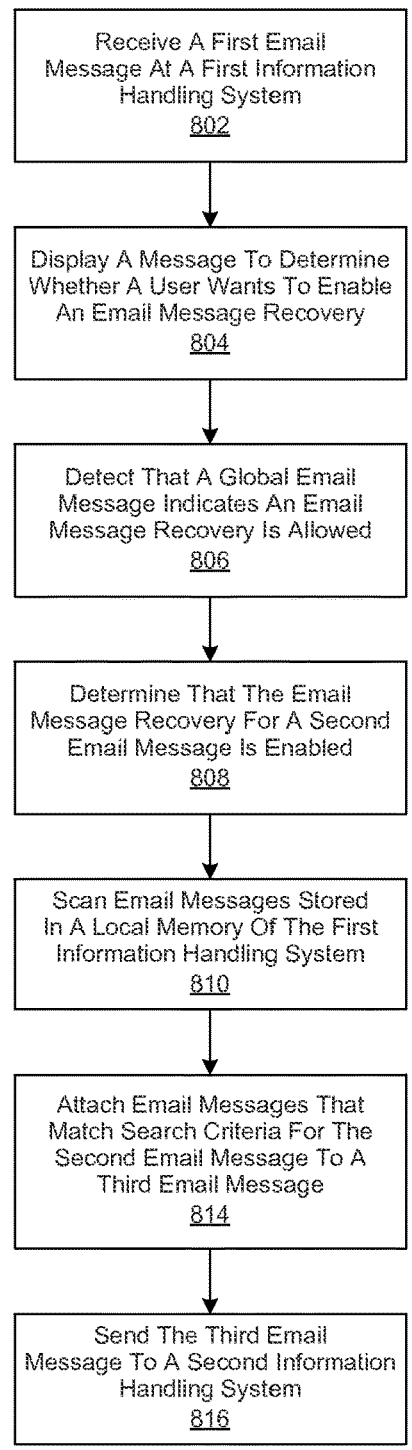
FIG. 8 is a flow diagram of another method for controlling recovery of an email message in an email message system.

FIG. 8 is a flow diagram of another method implemented in accordance with an embodiment of the invention for controlling recovery of an electronic mail (email) message in an email message system. At block 802, a first email message requesting a recovery of a second email message is received at a first information handling system. The first email message can be received from a second information handling system, and can include search criteria associated with the second email message. The search criteria can be a size range, a date range, subject line keywords, message body keywords, and the like. A message is displayed on a display device of the first information handling system at block 804. In an embodiment, the message asks whether a user wants to enable the email message recovery. At block 806, a global email message recovery is detected. In an embodiment, the global email message recovery can indicate that recovery of all email messages is allowed. A determination is made at the first information handling system that email message recovery is enabled at block 808. At block 810, email messages stored in the first information handling system are scanned for email messages that match the search criteria. At block 814, the email messages that match the search criteria are attached to a third email message. The third email message is sent to the second information handling system as a reply to the first email message at block 816. In an embodiment, a "Subject" line of the third email message can include particular words to indicate that the third email message is a response to an email message recovery request.

Figure 9:
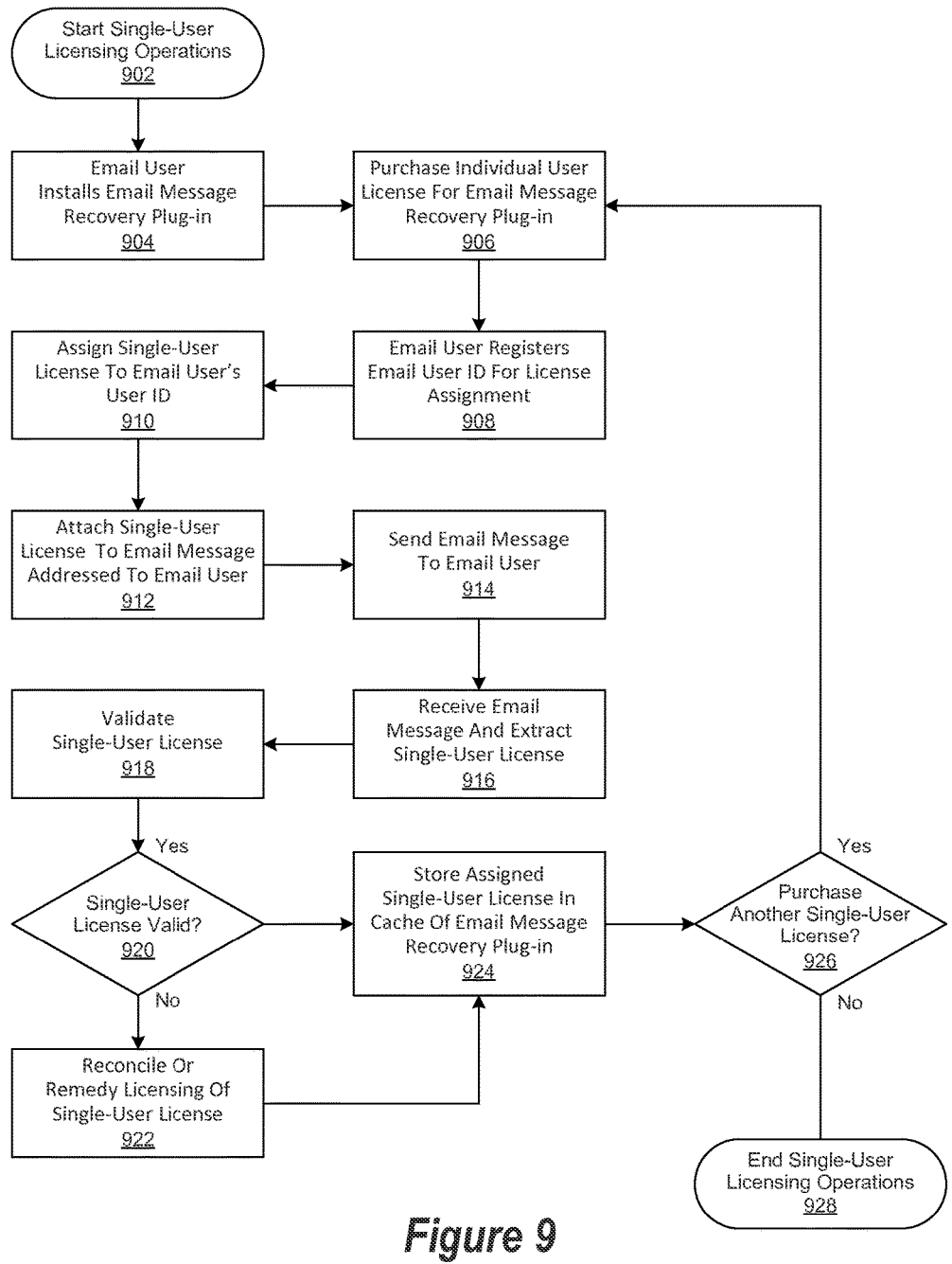
FIG. 9 is a flow diagram of a method for licensing at email message recovery plug-in application for use by an individual email user.

FIG. 9 is a flow diagram of a method implemented in accordance with an embodiment of the invention for licensing an email message recovery plug-in for use by an individual electronic mail email) user. In various embodiments, a single-user license for an email message recovery plug-in is assigned to an individual email user. In these various embodiments, the email message recovery plug-in may be installed in one or more nodes associated with the email user. As used herein, a node broadly refers to any system or device operable to access the features of the email message recovery plug-in.

In this embodiment, operations for licensing an email message recovery plug-in for an individual user are begun in block 902, followed by an email user installing an email message recovery plug-in in block 904. An individual user license for the email message recovery plug-in is then purchased in block 906, followed by the email user registering their email user ID (UID) for license assignment in block 908. Then, in block 910, the single user license is assigned to the email user's UID. In turn, the single-user license is then attached in block 912 to an email message addressed to the email user.

The email message is then sent to the email user in block 914, and once received, it is extracted from the email message in block 916. The single-user licensed is then validated in block 918, followed by a determination being made in block 920 whether the single-user license is valid (e.g., has it expired). If not, then the licensing of the single-user license is reconciled or remedied in block 922. Thereafter, or if it was determined in block 920 that the single-user license is valid, then it is stored in the cache of the previously-installed email message recovery plug-in in block 924. A determination is then made in block 926 whether to purchase another single-user license. If so, then the process is continued, proceeding with block 906. Otherwise, operations for licensing an email message recovery plug-in to an individual user is ended in block 928.

Figure 10A:
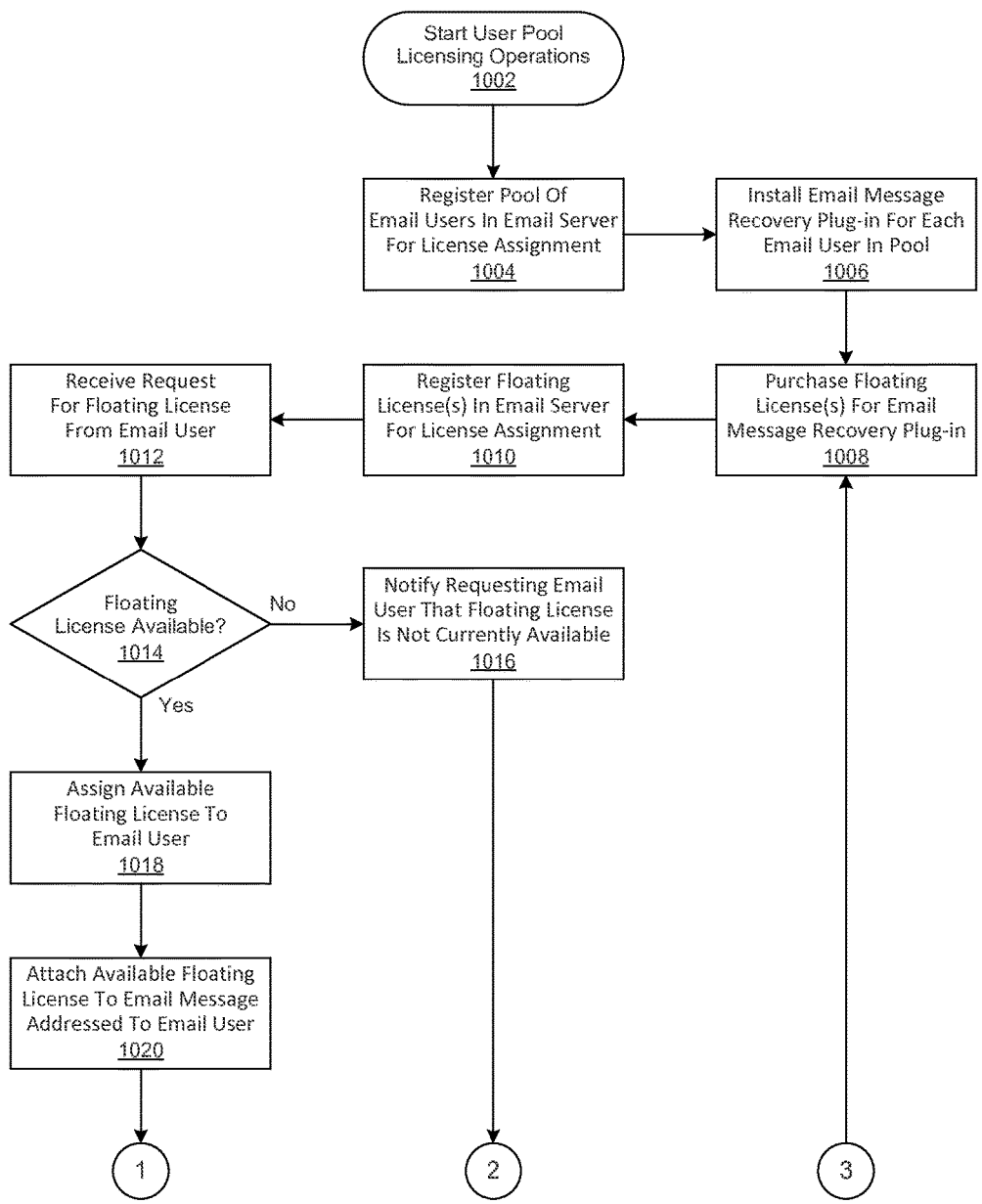
FIGS. 10a and 10b, referred to herein as FIG. 10, is a flow diagram of a method implemented in accordance with an embodiment of the invention for licensing an email message recovery plug-in for use by a pool of email users.
Figure 10B:
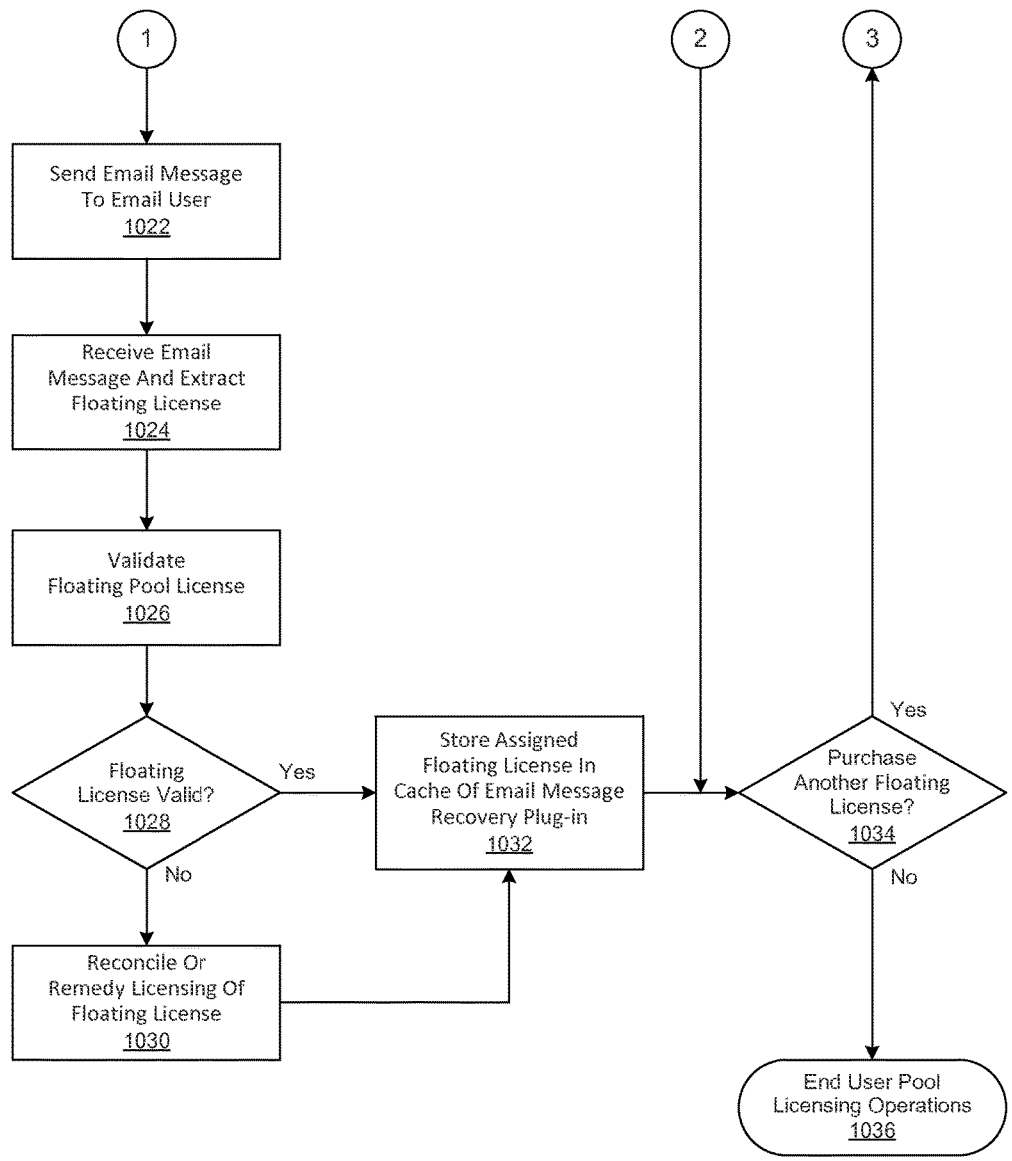

FIG. 10 is a flow diagram of a method implemented in accordance with an embodiment of the invention for licensing an email message recovery plug-in for use by a pool of electronic mail (email) users. In various embodiments, a floating license for an email message recovery plug-in is assigned to an individual email user of a pool, or group, of email users. In these various embodiments, the email message recovery plug-in may be installed in one or more nodes associated with any email user that is a member of the pool or group. However, the floating license is only valid for assignment to one email user at a time. Once the email user is no longer using the email message recovery plug-in, its assigned floating license is returned to the pool of licenses for reassignment to another email user.

In this embodiment, operations for licensing an email message recovery plug-in for use by a pool of email users are begun in block 1002, followed by registering the email user ID (UID) of each email user in a pool of email users in an email server in block 1004 for subsequent assignment of floating licenses. Then, in block 1006, an email message recovery plug-in is installed in various nodes associated with each of the registered email user in the pool of email users. One or more floating licenses are then purchased in block 1008. In turn, the purchased floating licenses are registered in the email server in block 1010.

A request for a floating license is then received from a member of the email user pool in block 1012, followed by a determination being made in block 1012 whether an unassigned floating license is available. If it is determined in block 1014 that an unassigned floating license is not available, then the requesting email user is so notified in block 1016. A determination is then made in block 1034 whether to purchase another floating license. If so, then the process is continued, proceeding with block 1008. Otherwise, operations for licensing an email message recovery plug-in for use by a pool of email users are ended in block 1036.

However, if it is determined in block 1014 that a floating license is available for assignment, then it is assigned to the UID of the requesting email user in block 1018. Then, in block 1020, the available floating license is attached to an email message addressed to the email user. The email message is then sent to the requesting email user in block 1022, and once received, it is extracted from the email message in block 1024.

The floating license is then validated in block 1026, followed by a determination being made in block 1028 whether the floating license is valid (e.g., has it expired or has a predetermined usage metric been exceeded). If not, then the licensing of the floating license is reconciled or remedied in block 1030. Thereafter, or if it was determined in block 1028 that the floating license is valid, then it is stored in the cache of the previously-installed email message recovery plug-in in block 1032. A determination is then made in block 1034 whether to purchase another floating license. If so, then the process is continued, proceeding with block 1008. Otherwise, operations for licensing an email message recovery plug-in for use by a pool of email users are ended in block 1036.

Figure 11:
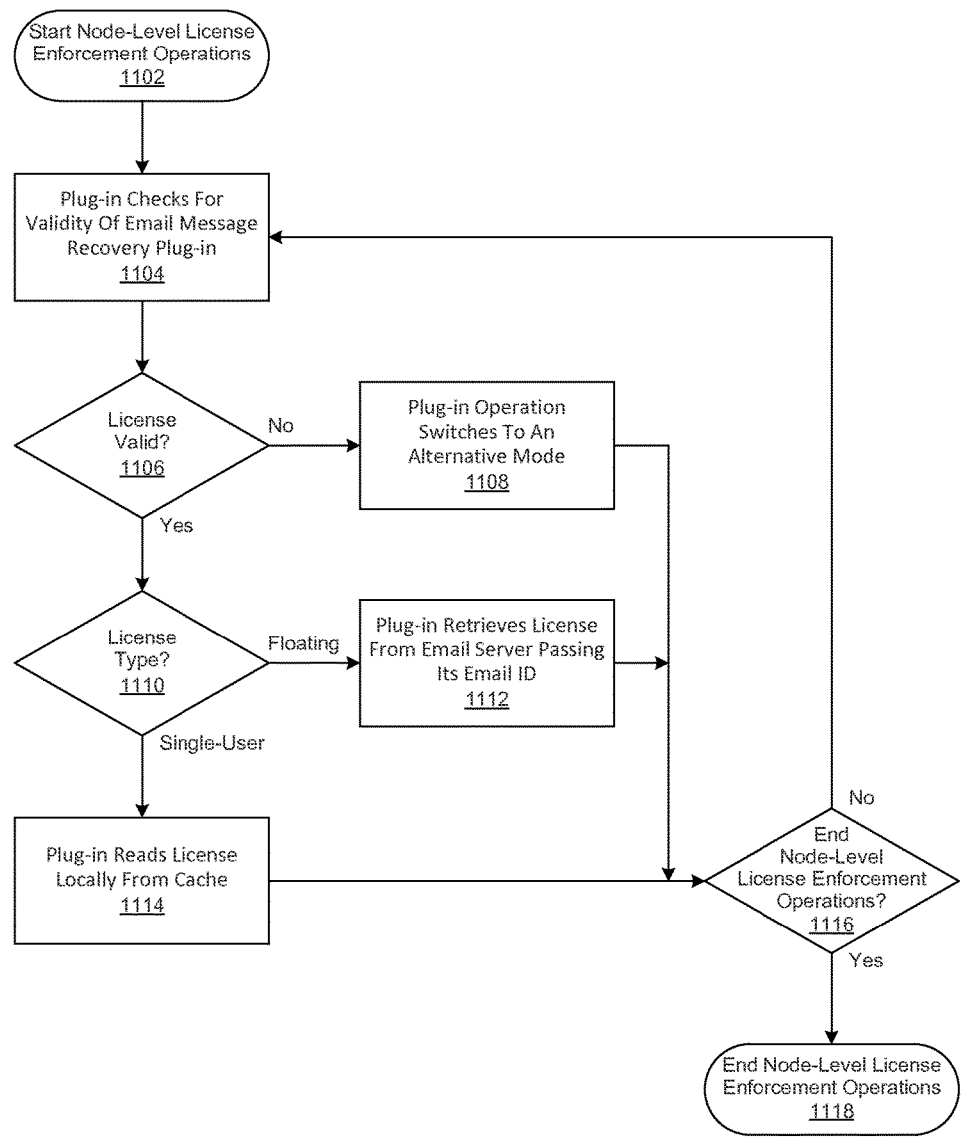

FIG. 11 is a flow diagram of a method implemented in accordance with an embodiment of the invention for performing node-level enforcement of a license for an email message recovery plug-in. In this embodiment, node-level license enforcement operations are begun in block 1102, followed by the email message recovery plug-in checking for the validity of its associated single-user or floating license in block 1104.

A determination is then made in block 1106 whether the license is valid (e.g., has it expired). If not, then the operation of the email message recovery plug-in switches to an alternative mode in block 1108. A determination is then made in block 1116 whether to end node-level license enforcement operations. If not, then the process is continued, proceeding with block 1104. Otherwise node-level license enforcement operations are ended in block 1118.

However, if it was determined in block 1106 that the license is valid, then a determination is made in block 1110 to determine whether the license is a floating license or a single-user license. If it is determined in block 1110 that the license is a floating license, then the email message recovery plug-in retrieves the license from the email server by passing the email user's user identifier (UID). The process is then continued, proceeding with block 1116. However, if it is determined in block 1110 that the license is a single-user license, then the email message recovery plug-in reads the license locally from its cache. The process is then continued, proceeding with block 1116.

Figure 12:
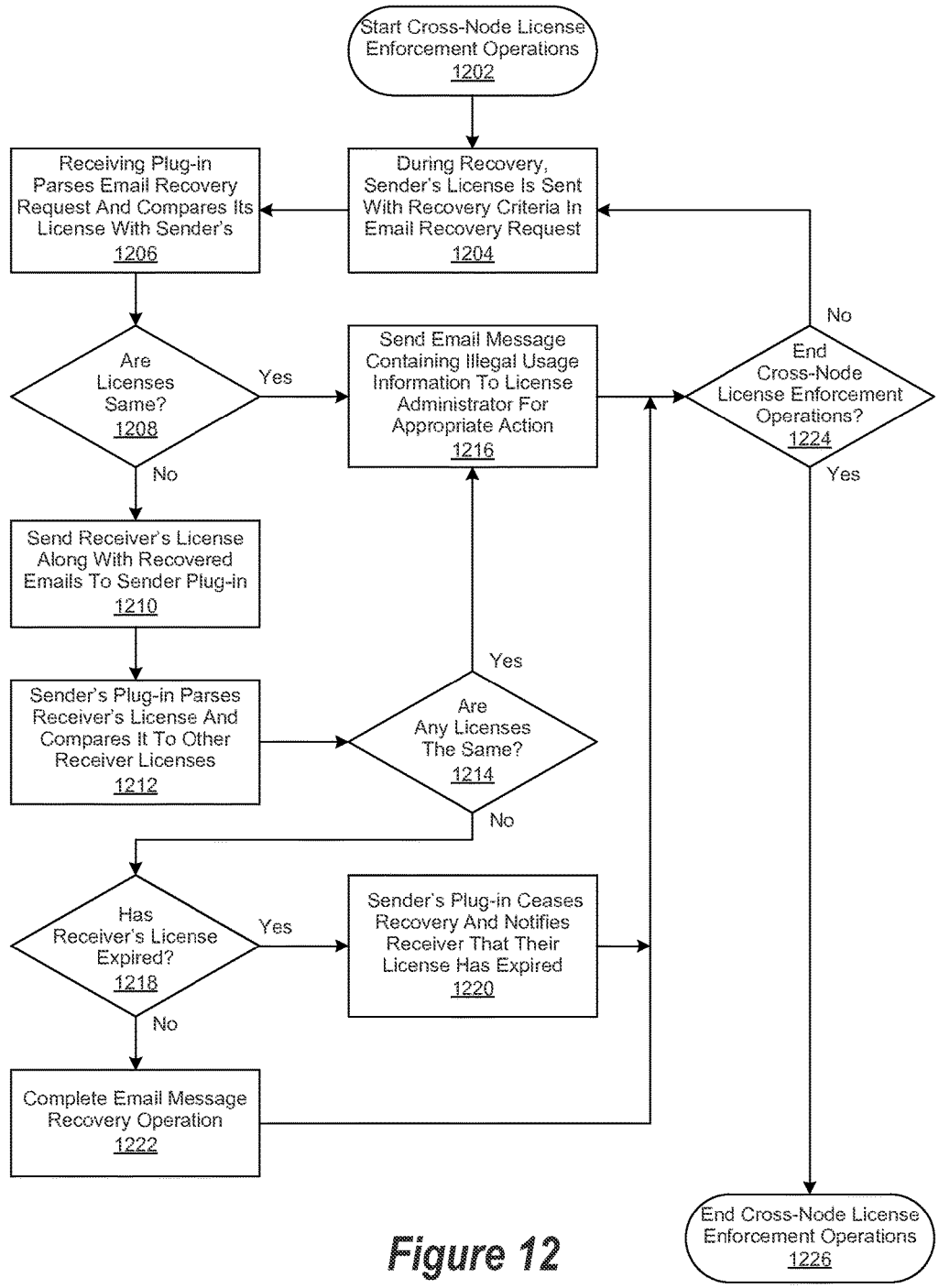

FIG. 12 is a flow diagram of a method implemented in accordance with an embodiment of the invention for performing cross-node enforcement of a license for an email message recovery plug-in. In this embodiment, cross-node license enforcement operations are begun in block 1202. Then, in block 1204, during an email message recovery operation described in greater detail herein, the sending email user's license for the email message recovery plug-in is sent along with the recovery criteria in an email recovery request. The receiver's email message recovery plug-in then parses the recovery request and compares its own license with the sender's license in block 1206.

A determination is then made in block 1208 whether the two licenses are the same. If so, then it is assumed that either one or both of the email users is illegally using the same license and an email usage message containing pertinent illegal usage information is sent to a license administrator in block 1216 for appropriate action. A determination is then made in block 1224 whether to end cross-node license enforcement operations. If not, then the process is continued, proceeding with block 1204. Otherwise, cross-node license enforcement operations are ended in block 1226. However, if it is determined in block 1208 that the licenses are not the same, then the receiver's license is sent in an email recovery response with any recovered email messages to the sender's email message recovery plug-in in block 1210. In turn, the sender's email message recovery plug-in parses the receiver's license from the email recovery response in block 1212 and compares it to licenses parsed from other email recovery responses.

A determination is then made in block 1212 whether any of the parsed licenses are the same. If so, then the process is continued, proceeding with block 1216. Otherwise, a determination is made in block 1218 whether the receiver's license for the email message recovery plug-in is expired. If so, then the sender's email message recovery plug-in ceases email message recovery operations in block 1220 and notifies the receiver that their license has expired. Otherwise, email message recovery operations are completed in block 1222. Thereafter, or after previously described operations are completed in block 1216 or block 1220, a determination is made in block 1224 whether to end cross-node license enforcement operations. If not, the process is continued, proceeding with block 1204. Otherwise, cross-node license enforcement operations are ended in block 1226.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for automating the enforcement of a license, comprising:
   generating a first electronic mail (email) message to request a recovery of a second email message, the first email message generated by a first email message recovery application associated with a first information handling system, the first email message recovery application executing within a first email message recovery plug-in, the first email message recovery plug-in comprising a first email plug-in license module, the first email message recovery plug-in executing along with a first email client application, the first email recovery application comprising an associated first personal folder file, the first personal folder file storing emails on the first information handling system;
   attaching a first license identifier to the first email message via the first email message recovery plug-in, the first license identifier associated with the first email message recovery application;
   sending the first email message to a second information handling system comprising a second email message recovery application, the second email recovery application comprising an associated second personal folder file, the second personal folder file storing emails on the second information handling system;
   receiving a third email message in response from the second information handling system, the third email message comprising the second email message and a second license identifier associated with the second email message recovery application;
   performing comparison operations to compare the first license identifier and the second license identifier;
   determining whether a first license associated with the first license identifier has expired; and
   performing a license remediation operation if the first license identifier and the second license identifier are not the same and the first license associated with the first license identifier has not expired, the license remediation operation recovering the second email message from the second personal folder file of the second email recovery application when the first license identifier and the second license identifier are not the same.

2. The method of claim 1, further comprising:
   generating a fourth email message to request a recovery of a third email message, the fourth email message generated by the first email message recovery application;
   attaching the first license identifier to the fourth email message;
   sending the fourth email message to a third information handling system comprising a third email message recovery application;
   receiving a fifth email message in response from the third information handling system, the fifth email message comprising the third email message and a third license identifier associated with the third email message recovery application;
   performing comparison operations to compare the first license identifier, the second license identifier, and the third license identifier; and
   performing a license remediation operation if any of the first license identifier, the second license identifier, the and third license identifiers are the same.

3. The method of claim 2, wherein:
   the first license identifier is associated with the email user identifier of a first user of the first information handling system;
   the second license identifier is associated with the email user identifier of a second user of the second information handling system; and
   the third license identifier is associated with the email user identifier of a third user of the third information handling system.

4. The method of claim 3, wherein:
the first license identifier, the second license identifier, and the third license identifier correspond to a first single user license, a second single user license and a third single user license to respectively use the first email message recovery application, the second email message recovery application, and the third email message recovery application; and
the first license, the second license, and the third license are respectively assigned to the first user, the second user, and the third user.

5. The method of claim 3, wherein:
the first license identifier, the second license identifier, and the third license identifier correspond to a first floating license, a second floating license, and a third floating license to respectively use the first email message recovery application, the second email message recovery application, and the third email message recovery application; and
the first license, the second license, and the third license are respectively assigned to the first user, the second user, and the third user.

6. The method of claim 5, wherein:
the first user, the second user, and the third user are members of a pool of email users; and
the first floating license, the second floating license, and the third floating license are assigned to the first user, the second user, and the third user in response to receiving a floating license request from a member of the pool of email users.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations to automate enforcement of a license and comprising instructions executable by the processor and configured for:
generating a first electronic mail (email) message to request a recovery of a second email message, the first email message generated by a first email message recovery application associated with a first information handling system, the first email message recovery application executing within a first email message recovery plug-in, the first email message recovery plug-in comprising a first email plug-in license module, the first email message recovery plug-in executing along with a first email client application, the first email recovery application comprising an associated first personal folder file, the first personal folder file storing emails on the first information handling system;
attaching a first license identifier to the first email message via the first email message recovery plug-in, the first license identifier associated with the first email message recovery application;
sending the first email message to a second information handling system comprising a second email message recovery application, the second email recovery application comprising an associated second personal folder file, the second personal folder file storing emails on the second information handling system;
receiving a third email message in response from the second information handling system, the third email message comprising the second email message and a second license identifier associated with the second email message recovery application;
performing comparison operations to compare the first license identifier and second license identifier;
determining whether a first license associated with the first license identifier has expired; and
performing a license remediation operation if the first license identifier and the second license identifier are not the same and the first license associated with the first license identifier has not expired, the license remediation operation recovering the second email message from the second personal folder file of the second email recovery application when the first license identifier and the second license identifier are not the same.

8. The system of claim 7, further comprising:
generating a fourth email message to request a recovery of a third email message, the fourth email message generated by the first email message recovery application;
attaching the first license identifier to the fourth email message;
sending the fourth email message to a third information handling system comprising a third email message recovery application;
receiving a fifth email message in response from the third information handling system, the fifth email message comprising the third email message and a third license identifier associated with the third email message recovery application;
performing comparison operations to compare the first license identifier, the second license identifier, and the third license identifier; and
performing a license remediation operation if any of the first license identifier, the second license identifier, and the third license identifier are the same.

9. The system of claim 8, wherein:
the first license identifier is associated with the email user identifier of a first user of the first information handling system;
the second license identifier is associated with the email user identifier of a second user of the second information handling system; and
the third license identifier is associated with the email user identifier of a third user of the third information handling system.

10. The system of claim 9, wherein:
the first license identifier, the second license identifier, and the third license identifier correspond to a first single user license, a second single user license, and a third single user license to respectively use the first email message recovery application, the second email message recovery application, and the third email message recovery application; and
the first license, the second license, and the third license are respectively assigned to the first user, the second user, and the third user.

11. The system of claim 9, wherein:
the first license identifier, the second license identifier, and the third license identifier correspond to a first floating license, a second floating license, and a third floating license to respectively use the first email message recovery application, the second email message recovery application, and the third email message recovery application; and the first license, the second license, and the third license are respectively assigned to the first user, the second user, and the third user.

12. The system of claim 11, wherein:

the first user, the second user, and the third user are members of a pool of email users; and the first floating license, the second floating license, and the third floating license are assigned to the first user, the second user, and the third user in response to receiving a floating license request from a member of the pool of email users.

13. A non-transitory, computer-readable storage medium embodying computer program code, the computer program code comprising computer executable instructions configured for:

generating a first electronic mail (email) message to request a recovery of a second email message, the first email message generated by a first email message recovery application associated with a first information handling system, the first email message recovery application executing within a first email message recovery plug-in, the first email message recovery plug-in comprising a first email plug-in license module, the first email message recovery plug-in executing along with a first email client application, the first email recovery application comprising an associated first personal folder file, the first personal folder file storing emails on the first information handling system;

attaching a first license identifier to the first email message via the first email message recovery plug-in, the first license identifier associated with the first email message recovery application;

sending the first email message to a second information handling system comprising a second email message recovery application, the second email recovery application comprising an associated second personal folder file, the second personal folder file storing emails on the second information handling system;

receiving a third email message in response from the second information handling system, the third email message comprising the second email message and a second license identifier associated with the second email message recovery application;

performing comparison operations to compare the first license identifier and the second license identifier; and determining whether a first license associated with the first license identifier has expired; and performing a license remediation operation if the first license identifier and the second license identifier are not the same and the first license associated with the first license identifier has not expired, the license remediation operation recovering the second email message from the second personal folder file of the second email recovery application when the first license identifier and the second license identifier are not the same.

14. The non-transitory, computer-readable storage medium of claim 13, further comprising:

generating a fourth email message to request a recovery of a third email message, the fourth email message generated by the first email message recovery application;

attaching the first license identifier to the fourth email message;

sending the fourth email message to a third information handling system comprising a third email message recovery application;

receiving a fifth email message in response from the third information handling system, the fifth email message comprising the third email message and a third license identifier associated with the third email message recovery application;

performing comparison operations to compare the first license identifier, the second license identifier, and the third license identifier; and performing a license remediation operation if any of the first license identifier, the second license identifier, and the third license identifier are the same.

15. The non-transitory, computer-readable storage medium of claim 14, wherein:

the first license identifier is associated with the email user identifier of a first user of the first information handling system;

the second license identifier is associated with the email user identifier of a second user of the second information handling system; and the third license identifier is associated with the email user identifier of a third user of the third information handling system.

16. The non-transitory, computer-readable storage medium of claim 15, wherein:

the first license identifier, the second license identifier, and the third license identifier correspond to a first single user license, a second single user license and a third single user license to respectively use the first email message recovery application, the second email message recovery application, and the third email message recovery application; and the first license, the second license, and the third license are respectively assigned to the first user, the second user, and the third user.

17. The non-transitory, computer-readable storage medium of claim 15, wherein:

the first license identifier, the second license identifier, and the third license identifier correspond to a first floating license, a second floating license, and a third floating license to respectively use the first email message recovery application, the second email message recovery application, and the third email message recovery application; and the first license, the second license, and the third license are respectively assigned to the first user, the second user, and the third user.

18. The non-transitory, computer-readable storage medium of claim 17, wherein:

the first user, the second user, and the third user are members of a pool of email users; and the first floating license, the second floating license, and the third floating license are assigned to the first user, the second user, and the third user in response to receiving a floating license request from a member of the pool of email users.

* * * * *